United States Patent
Kim et al.

(10) Patent No.: US 9,395,860 B2
(45) Date of Patent: Jul. 19, 2016

(54) CAPACITIVE TOUCH PANEL INPUT DEVICE WITH IMPROVED SIGNAL-TO-NOISE DETECTION AND INPUT DETECTION METHOD THEREOF

(71) Applicant: HiDeep Inc., Gyeonggi-do (KR)

(72) Inventors: Bonkee Kim, Seoul (KR); Jeong Hwan Lee, Gyeonggi-do (KR)

(73) Assignee: HIDEEP INC. (KR)

( * ) Notice: Subject to any disclaimer, the term of this patent is extended or adjusted under 35 U.S.C. 154(b) by 0 days.

(21) Appl. No.: 14/487,579

(22) Filed: Sep. 16, 2014

(65) Prior Publication Data
US 2015/0077390 A1   Mar. 19, 2015

(30) Foreign Application Priority Data

Sep. 16, 2013 (KR) .................. 10-2013-0110975

(51) Int. Cl.
  G06F 3/045 (2006.01)
  G06F 3/044 (2006.01)
  G06F 3/041 (2006.01)

(52) U.S. Cl.
  CPC ............. *G06F 3/044* (2013.01); *G06F 3/0416* (2013.01)

(58) Field of Classification Search
  CPC .............................. G06F 3/044; G06F 3/0416
  USPC ........................................................ 345/174
  See application file for complete search history.

(56) References Cited

U.S. PATENT DOCUMENTS

| | | | |
|---|---|---|---|
| 5,442,147 A * | 8/1995 | Burns ................... | G06F 3/0321 178/18.09 |
| 7,075,316 B2 * | 7/2006 | Umeda ............... | G01R 27/2605 324/658 |
| 2011/0055305 A1 | 3/2011 | Matsushima | |
| 2013/0176271 A1 | 7/2013 | Sobel et al. | |
| 2013/0211757 A1 * | 8/2013 | Miyamoto ............ | G06F 3/0416 702/65 |

OTHER PUBLICATIONS

European Appln. No. 14184917.4—Extended European Search Report dated Mar. 19, 2015.

* cited by examiner

*Primary Examiner* — Kwang-Su Yang
(74) *Attorney, Agent, or Firm* — Kane Kessler, P.C.; Barry E. Negrin

(57) ABSTRACT

A touch panel input device and an input detection method thereof are provided. A driving signal is controlled to include a plurality of time intervals in which the driving signal is applied to at least one of at least two driving signal electrodes simultaneously driven, and in which the driving signal is not applied to at least one of at least two driving signal electrodes simultaneously driven. A driving signal supplier causes that a combination of the driving signal electrode to which the driving signal is applied in one of the plurality of time intervals and the driving signal electrode to which the driving signal is not applied in the one of the plurality of time intervals is different from a combination of the driving signal electrode to which the driving signal is applied in the other of the plurality of time intervals and the driving signal electrode to which the driving signal is not applied in the other of the plurality of time intervals. At least one among the driving signals which are simultaneously applied to the driving signal electrode has a phase difference from the other driving signals.

6 Claims, 7 Drawing Sheets

Fig. 2a

| 1 | 1 | 1 | 0 | 1 | 0 | 1 | 1 | 0 | 0 | 1 | 0 | 0 | 0 | 1 |
|---|---|---|---|---|---|---|---|---|---|---|---|---|---|---|
| 1 | 1 | 0 | 1 | 0 | 1 | 1 | 0 | 0 | 1 | 0 | 0 | 0 | 1 | 1 |
| 1 | 0 | 1 | 0 | 1 | 1 | 0 | 0 | 1 | 0 | 0 | 0 | 1 | 1 | 1 |
| 0 | 1 | 0 | 1 | 1 | 0 | 0 | 1 | 0 | 0 | 0 | 1 | 1 | 1 | 1 |
| 1 | 0 | 1 | 1 | 0 | 0 | 1 | 0 | 0 | 0 | 1 | 1 | 1 | 1 | 0 |
| 0 | 1 | 1 | 0 | 0 | 1 | 0 | 0 | 0 | 1 | 1 | 1 | 1 | 0 | 1 |
| 1 | 1 | 0 | 0 | 1 | 0 | 0 | 0 | 1 | 1 | 1 | 1 | 0 | 1 | 0 |
| 1 | 0 | 0 | 1 | 0 | 0 | 0 | 1 | 1 | 1 | 1 | 0 | 1 | 0 | 1 |
| 0 | 0 | 1 | 0 | 0 | 0 | 1 | 1 | 1 | 1 | 0 | 1 | 0 | 1 | 1 |
| 0 | 1 | 0 | 0 | 0 | 1 | 1 | 1 | 1 | 0 | 1 | 0 | 1 | 1 | 0 |
| 1 | 0 | 0 | 0 | 1 | 1 | 1 | 1 | 0 | 1 | 0 | 1 | 1 | 0 | 0 |
| 0 | 0 | 0 | 1 | 1 | 1 | 1 | 0 | 1 | 0 | 1 | 1 | 0 | 0 | 1 |
| 0 | 0 | 1 | 1 | 1 | 1 | 0 | 1 | 0 | 1 | 1 | 0 | 0 | 1 | 0 |
| 0 | 1 | 1 | 1 | 1 | 0 | 1 | 0 | 1 | 1 | 0 | 0 | 1 | 0 | 0 |
| 1 | 1 | 1 | 1 | 0 | 1 | 0 | 1 | 1 | 0 | 0 | 1 | 0 | 0 | 0 |

Fig. 2b

| 1 | 1 | 1 | -1 | 1 | -1 | 1 | 1 | -1 | -1 | 1 | -1 | -1 | -1 | 1 |
|---|---|---|---|---|---|---|---|---|---|---|---|---|---|---|
| 1 | 1 | -1 | 1 | -1 | 1 | 1 | -1 | -1 | 1 | -1 | -1 | -1 | 1 | 1 |
| 1 | -1 | 1 | -1 | 1 | 1 | -1 | -1 | 1 | -1 | -1 | -1 | 1 | 1 | 1 |
| -1 | 1 | -1 | 1 | 1 | -1 | -1 | 1 | -1 | -1 | -1 | 1 | 1 | 1 | 1 |
| 1 | -1 | 1 | 1 | -1 | -1 | 1 | -1 | -1 | -1 | 1 | 1 | 1 | 1 | -1 |
| -1 | 1 | 1 | -1 | -1 | 1 | -1 | -1 | -1 | 1 | 1 | 1 | 1 | -1 | 1 |
| 1 | 1 | -1 | -1 | 1 | -1 | -1 | -1 | 1 | 1 | 1 | 1 | -1 | 1 | -1 |
| 1 | -1 | -1 | 1 | -1 | -1 | -1 | 1 | 1 | 1 | 1 | -1 | 1 | -1 | 1 |
| -1 | -1 | 1 | -1 | -1 | -1 | 1 | 1 | 1 | 1 | -1 | 1 | -1 | 1 | 1 |
| -1 | 1 | -1 | -1 | -1 | 1 | 1 | 1 | 1 | -1 | 1 | -1 | 1 | 1 | -1 |
| 1 | -1 | -1 | -1 | 1 | 1 | 1 | 1 | -1 | 1 | -1 | 1 | 1 | -1 | -1 |
| -1 | -1 | -1 | 1 | 1 | 1 | 1 | -1 | 1 | -1 | 1 | 1 | -1 | -1 | 1 |
| -1 | -1 | 1 | 1 | 1 | 1 | -1 | 1 | -1 | 1 | 1 | -1 | -1 | 1 | -1 |
| -1 | 1 | 1 | 1 | 1 | -1 | 1 | -1 | 1 | 1 | -1 | -1 | 1 | -1 | -1 |
| 1 | 1 | 1 | 1 | -1 | 1 | -1 | 1 | 1 | -1 | -1 | 1 | -1 | -1 | -1 |

Fig. 3a

| 1 | 1 | 1 | 0 | 1 | 0 | 1 | 1 | 0 | 0 | -1 | 0 | 0 | 0 | -1 |
|---|---|---|---|---|---|---|---|---|---|---|---|---|---|---|
| 1 | 1 | 0 | 1 | 0 | 1 | 1 | 0 | 0 | -1 | 0 | 0 | 0 | -1 | -1 |
| 1 | 0 | 1 | 0 | 1 | 1 | 0 | 0 | -1 | 0 | 0 | 0 | -1 | -1 | -1 |
| 0 | 1 | 0 | 1 | 1 | 0 | 0 | 1 | 0 | 0 | 0 | -1 | -1 | -1 | -1 |
| 1 | 0 | 1 | 1 | 0 | 0 | 1 | 0 | 0 | 0 | -1 | -1 | -1 | -1 | 0 |
| 0 | 1 | 1 | 0 | 0 | 1 | 0 | 0 | 0 | -1 | -1 | -1 | -1 | 0 | -1 |
| 1 | 1 | 0 | 0 | 1 | 0 | 0 | 0 | -1 | -1 | -1 | -1 | 0 | -1 | 0 |
| 1 | 0 | 0 | 1 | 0 | 0 | 0 | 1 | -1 | -1 | -1 | 0 | -1 | 0 | -1 |
| 0 | 0 | 1 | 0 | 0 | 0 | 1 | 1 | -1 | -1 | 0 | -1 | 0 | -1 | -1 |
| 0 | 1 | 0 | 0 | 0 | 1 | 1 | 1 | -1 | 0 | -1 | 0 | -1 | -1 | 0 |
| 1 | 0 | 0 | 0 | 1 | 1 | 1 | 1 | 0 | -1 | 0 | -1 | -1 | 0 | 0 |
| 0 | 0 | 0 | 1 | 1 | 1 | 1 | 0 | -1 | 0 | -1 | -1 | 0 | 0 | -1 |
| 0 | 0 | 1 | 1 | 1 | 1 | 0 | 1 | 0 | -1 | -1 | 0 | 0 | -1 | 0 |
| 0 | 1 | 1 | 1 | 1 | 0 | 1 | 0 | -1 | -1 | 0 | 0 | -1 | 0 | 0 |
| 1 | 1 | 1 | 1 | 0 | 1 | 0 | 1 | -1 | 0 | 0 | -1 | 0 | 0 | 0 |

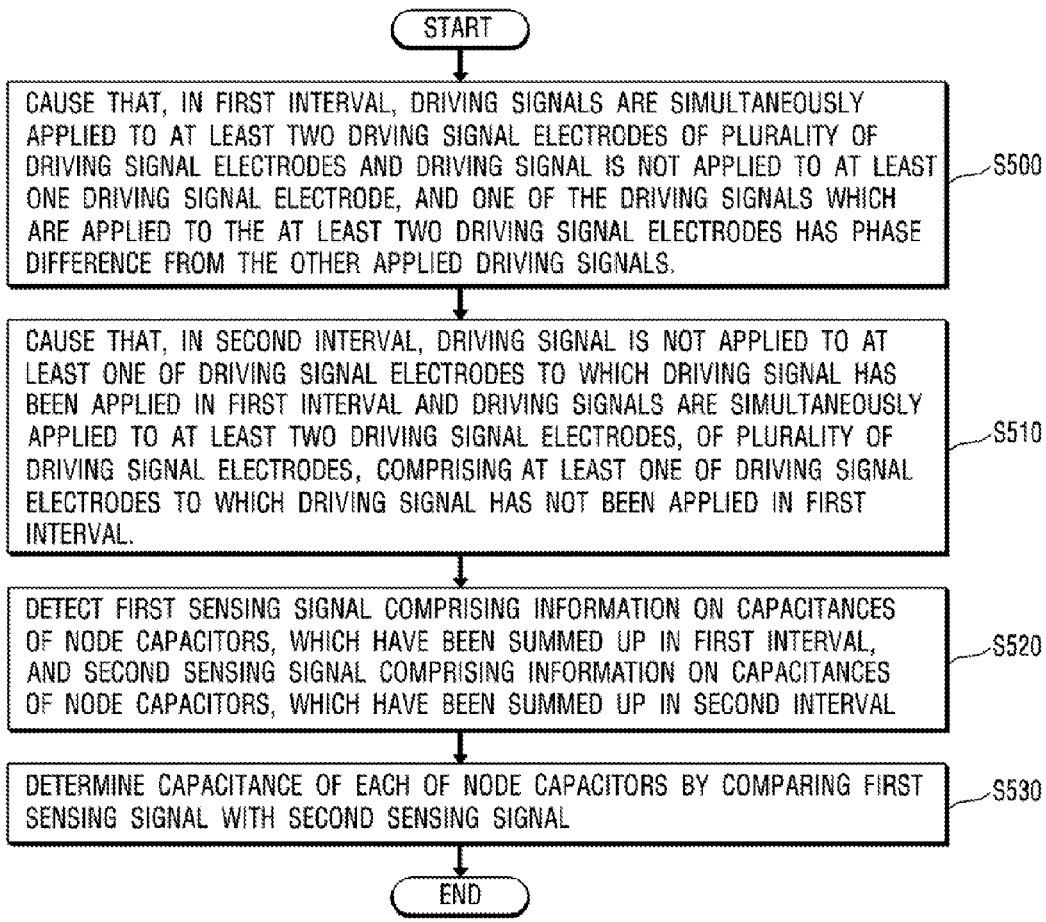

CAPACITIVE TOUCH PANEL INPUT DEVICE WITH IMPROVED SIGNAL-TO-NOISE DETECTION AND INPUT DETECTION METHOD THEREOF

BACKGROUND

1. Field

The present invention relates to a touch panel input device and an input detection method thereof, and more particularly to a touch panel input device capable of improving a signal-to-noise ratio of a touch panel and an input detection method thereof.

2. Description of Related Art

In general, with the development of electronic communication technologies, a variety of electronic devices are being provided. Such an electronic device increasingly has a tendency to emphasize manipulation easiness for users and a good design. It is diversification of an input device represented by a keyboard or a keypad that is emphasized according to the trend.

The input device has been developed from data processing through the input device, e.g., a keyboard, a keypad, etc., to an available touch panel functioning as both an input device and an output device. The touch panel commonly designates an input device allowing a user to input by touching a screen of a display device without separate input equipments.

The touch panel detects whether the touch is input or not by detecting a capacitance stored in a plurality of node capacitors formed by row lines and column lines which are arranged to cross each other in the form of a matrix. However, since the capacitance of the node capacitor is changed due to the influence of noise, etc., generated from the display device, there is a possibility of malfunction of the touch panel.

SUMMARY

One embodiment is a touch panel input device that includes: a touch panel which includes a plurality of node capacitors, each of which is formed by one of a plurality of driving signal electrodes and one of a plurality of sensing signal electrodes; a driving signal supplier which drives simultaneously at least two of the plurality of driving signal electrodes by applying driving signals; and a sensing signal part which receives a sensing signal including information on capacitances of the plurality of node capacitors through the plurality of sensing signal electrodes. The driving signal is driven to include a plurality of time intervals in which the driving signal is applied to at least one of the at least two driving signal electrodes simultaneously driven, and in which the driving signal is not applied to at least one of the at least two driving signal electrodes simultaneously driven. The driving signal supplier causes that a combination of the driving signal electrode to which the driving signal is applied in one of the plurality of time intervals and the driving signal electrode to which the driving signal is not applied in the one of the plurality of time intervals is different from a combination of the driving signal electrode to which the driving signal is applied in the other of the plurality of time intervals and the driving signal electrode to which the driving signal is not applied in the other of the plurality of time intervals. At least one among the driving signals which are simultaneously applied to the driving signal electrode has a phase difference from the other driving signals.

Additionally, the combination of the driving signal electrode to which the driving signal is applied and the driving signal electrode to which the driving signal is not applied is formed through a Pseudo-Random Bit Stream (PRBS) code. The driving signals having the phase difference correspond to a code obtained by multiplying the PRBS code by −1.

Additionally, the phase difference is 180 degree.

Additionally, the sensing signal part further includes an amplifier. The amplifier sums up the capacitances of the plurality of node capacitors to which the applied driving signal is transmitted.

Additionally, the sensing signal part further includes an A/D converter which is connected to the amplifier and converts the signal transmitted from the amplifier into a digital signal.

Additionally, the touch panel input device further includes a controller. The controller controls an output from the driving signal supplier and detection of the sensing signal part.

Another embodiment is a touch input detection method for detecting the touch location by detecting the capacitance of the node capacitor in the touch panel comprising the plurality of node capacitors, each of which is formed by one of the plurality of driving signal electrodes and one of the plurality of sensing signal electrodes. The method includes: driving the plurality of driving signal electrodes by applying driving signals, causing that, in a first interval, the driving signal is applied to at least two driving signal electrodes of the plurality of driving signal electrodes and the driving signal is not applied to at least one driving signal electrode of the plurality of driving signal electrodes, and causing that one of the driving signals which are applied to the at least two driving signal electrodes has a phase difference from the other driving signals; causing that, in a second interval, the driving signal is not applied to at least one of the driving signal electrodes to which the driving signal has been simultaneously applied in the first interval and the driving signal is simultaneously applied to at least two driving signal electrodes, among the plurality of driving signal electrodes, comprising at least one of the driving signal electrodes to which the driving signal has not been applied in the first interval, and causing that one driving signal among the driving signals which are applied to the at least two driving signal electrodes has a phase difference from the other driving signals; detecting a first sensing signal comprising information on the capacitances of the node capacitors, which have been summed up in the first interval, and a second sensing signal comprising information on the capacitances of the node capacitors, which have been summed up in the second interval; and determining the capacitance of each of the node capacitors by comparing the first sensing signal with the second sensing signal.

Additionally, a combination of the driving signal electrode to which the driving signal is applied and the driving signal electrode to which the driving signal is not applied corresponds to a Pseudo-Random Bit Stream (PRBS) code. The driving signals having a phase difference correspond to a code obtained by multiplying the PRBS code by −1.

BRIEF DESCRIPTION OF THE DRAWINGS

FIG. 2a is a view showing an embodiment of a PRBS code;

FIG. 2b is a view showing an inverse matrix of the PRBS code shown in FIG. 2a;

FIG. 3a is a view showing a matrix showing a code generating a driving signal in a driving signal supplier;

FIG. 3b is a showing a matrix which shows showing a waveform of a driving signal corresponding to the matrix shown in FIG. 3a;

FIG. 5 is a flowchart showing a method for detecting an input in the touch panel input device shown in FIG. 1.

DETAILED DESCRIPTION

Figure 1:
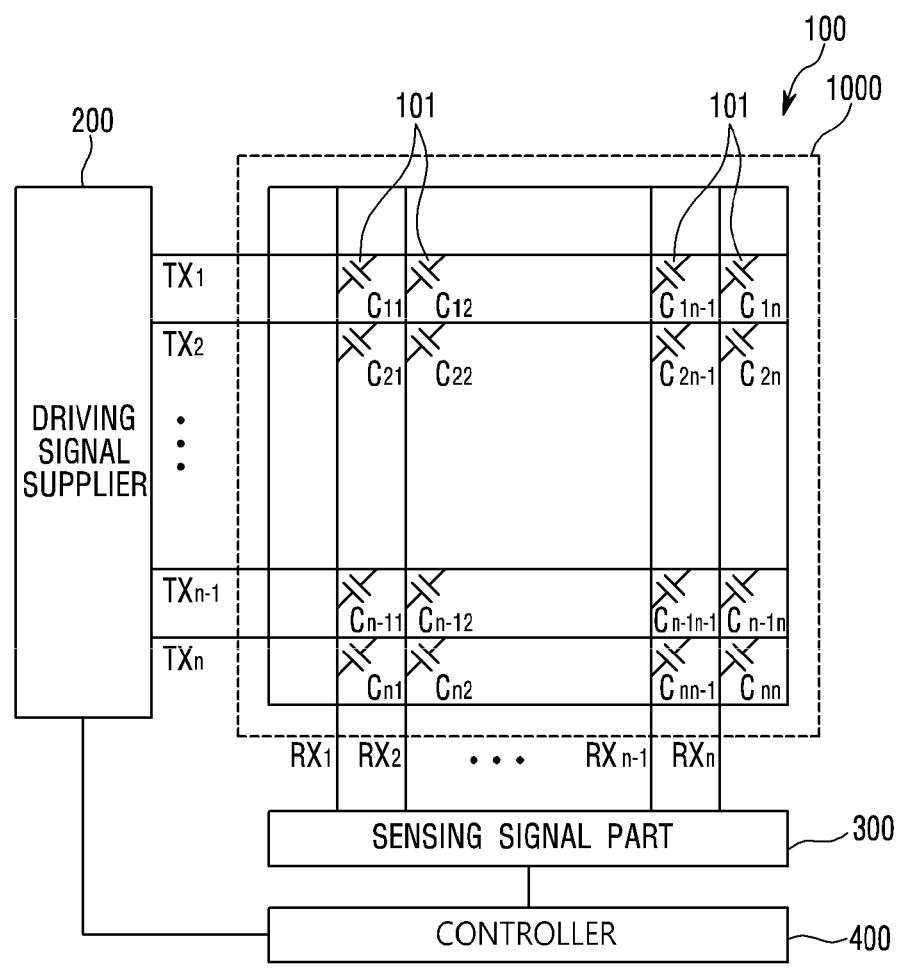
FIG. 1 is a view showing a structure of an embodiment of a touch panel input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, a touch panel input device and an input detection method thereof will be described with reference to the accompanying drawings.

FIG. 1 is a view showing a structure of an embodiment of a touch panel input device according to an embodiment of the present invention.

Referring to FIG. 1, a touch panel input device 1000 includes a touch panel 100, a driving signal supplier 200 and a sensing signal part 300. The touch panel 100 includes a plurality of node capacitors 101. Each node capacitor 101 is formed by one of a plurality of driving signal electrodes TX1, TX2, . . . , TXn−1 and TXn and one of a plurality of sensing signal electrodes RX1, RX2, . . . , RXn−1 and RXn. The driving signal supplier 200 may simultaneously drive at least two of the plurality of driving signal electrodes by applying a driving signal. The sensing signal part 300 may receive a sensing signal including information on capacitances of the plurality of node capacitors 101 through the plurality of sensing signal electrodes RX1, RX2, . . . , RXn−1 and RXn.

The touch panel 100 includes the plurality of driving signal electrodes TX1, TX2, . . . , TXn−1 and TXn and the plurality of sensing signal electrodes RX1, RX2, . . . , RXn−1 and RXn and may be disposed on or within a display unit. However, the location of the touch panel 100 is not limited to this. A liquid crystal display (LCD), an organic light emitting display (OLED) and the like may be taken as an example of the display unit in which the touch panel 100 is formed. However, the example of the display unit is not limited to this.

In the following descriptions and accompanying drawings, it is shown that the plurality of driving signal electrodes TX1, TX2, . . . , TXn−1 and TXn and the plurality of sensing signal electrodes RX1, RX2, . . . , RXn−1 and RXn of the touch panel 100 form an orthogonal array. However, the embodiment of the present invention is not limited to this. The plurality of driving signal electrodes TX1, TX2, . . . , TXn−1 and TXn and the plurality of sensing signal electrodes RX1, RX2, . . . , RXn−1 and RXn may have an array of arbitrary dimension, for example, a diagonal array, a concentric array, a 3-dimensional random array, etc., and an array obtained by the application of them. Also, the plurality of driving signal electrodes TX1, TX2, . . . , TXn−1 and TXn and the plurality of sensing signal electrodes RX1, RX2, . . . , RXn−1 and RXn may be formed of a transparent conductive material (for example, indium tin oxide (ITO) or antimony tin oxide (ATO)) and the like. However, there is no limit to this. The plurality of driving signal electrodes TX1, TX2, . . . , TXn−1 and TXn and the plurality of sensing signal electrodes RX1, RX2, . . . , RXn−1 and RXn may be formed of another transparent material or an opaque conductive material like copper, etc. Also, although it is shown that the number of the plurality of driving signal electrodes TX1, TX2, . . . , TXn−1 and TXn is the same as the number of the plurality of sensing signal electrodes RX1, RX2, . . . , RXn−1 and RXn, there is no limit to this. The numbers may be changed according to the shape of the touch panel 100.

In the touch panel 100, the plurality of node capacitors 101 may be formed by the plurality of driving signal electrodes TX1, TX2, . . . , TXn−1 and TXn and the plurality of sensing signal electrodes RX1, RX2, . . . , RXn−1 and RXn. Here, although the plurality of driving signal electrodes TX1, TX2, . . . , TXn−1 and TXn and the plurality of sensing signal electrodes RX1, RX2, . . . , RXn−1 and RXn are represented respectively by lines, they may be actually implemented with an electrode pattern. Also, the width of the plurality of driving signal electrodes TX1, TX2, . . . , TXn−1 and TXn may be different from the width of the plurality of sensing signal electrodes RX1, RX2, . . . , RXn−1 and RXn.

The driving signal supplier 200 may apply driving signals to the plurality of driving signal electrodes TX1, TX2, . . . , TXn−1 and TXn. When the driving signals are applied to the plurality of driving signal electrodes TX1, TX2, . . . , TXn−1 and TXn, the driving signals may be applied to one ends of the node capacitors 101. By applying the driving signal which is generated by the driving signal supplier 200, at least two of the plurality of driving signal electrodes TX1, TX2, . . . , TXn−1 and TXn are simultaneously driven in each interval. The driving signal may be controlled to include a plurality of time intervals in which the driving signal is applied to at least one of at least two driving signal electrodes simultaneously driven, and in which the driving signal is not applied to at least one of at least two driving signal electrodes simultaneously driven. Here, a combination of the driving signal electrode to which the driving signal is applied in one interval and the driving signal electrode to which the driving signal is not applied in the one interval may be set to be different from a combination of the driving signal electrode to which the driving signal is applied in at least another interval and the driving signal electrode to which the driving signal is not applied in the at least another interval. Here, the one interval may be designated as a first interval, and the another interval may be designated as a second interval. In the embodiment, the combination of the driving signal electrode to which the driving signal is applied and the driving signal electrode to which the driving signal is not applied can be intended to correspond to a Pseudo-Random Bit Stream (PRBS) code.

Here, the "simultaneously" does not mean only the fact that the driving signal is applied to the at least two driving signal electrodes at the complete same time, and may mean that the driving signal is applied at a certain time interval. The supplying of the driving signal may mean that a pulse is generated and transmitted to the driving signal electrode. The pulse may be in a high-state or low-state.

Also, in the driving signals which are applied by the driving signal supplier 200, at least one of the driving signals which are simultaneously applied may have a phase difference from the other driving signals. The phase difference may be 180 degree.

The sensing signal part 300 detects the sizes of the capacitances of the plurality of the node capacitors 101, which are transmitted through the sensing signal electrodes RX1, RX2, ..., RXn−1 and RXn respectively. Here, the sensing signal part 300 sums up the capacitances of the node capacitors 101 detected in the first interval and sums up the capacitances of the node capacitors detected in the second interval, and then is able to determines the capacitance of each of the node capacitors 101 by using the capacitance summed in each interval.

In the embodiment, since the driving signals which are transmitted to the node capacitors 101 in each interval including the first and the second interval include the driving signals having a phase difference, the sum of the capacitances of the node capacitors 101 in the first interval or the second interval may be less than the sum the capacitances of the node capacitors 101 generated by the driving signal with no phase difference.

In the embodiment, the touch panel input device 1000 may further include a controller 400. The controller 400 controls the driving signal supplier 200 and the sensing signal part 300, thereby causing the driving signal supplier 200 to output the driving signal and causing the sensing signal part 300 to detect the capacitance of the node capacitor 101 through the plurality of sensing signal electrodes RX1, RX2, ..., RXn−1 and RXn.

FIG. 2a is a view showing an embodiment of a code which is transmitted to the driving signal supplier shown in FIG. 1. FIG. 2b is a view showing an inverse matrix of the code shown in FIG. 2a.

A matrix shown in FIG. 2b is formed by using a 4-bit Pseudo-Random Bit Stream (PRBS) code and has a size of 15×15. However, there is no limit to this. By using a 5-bit PRBS code, a matrix having a size of 31×31 can be obtained. Also, by using a 3-bit PRBS code, a matrix having a size of 7×7 can be obtained. A combination of the driving signals which are simultaneously applied through seven driving signal electrodes may be formed by using a 7×7 matrix. A combination of the driving signals which are simultaneously applied through fifteen driving signal electrodes may be formed by using a 15×15 matrix. A combination of the driving signals which are simultaneously applied through thirty one driving signal electrodes may be formed by using a 31×31 matrix. Here, for convenience of description, the matrix having a size of 15×15 will be described.

Referring to FIGS. 2a and 2b, the 15×15 matrix can be formed by using the 4-bit PRBS code and is shown in FIG. 2b. Regarding the 15×15 matrix shown in FIG. 2b, through the substitution of −1 by 0, the 15×15 matrix shown in FIG. 2a can be obtained. The matrix shown in FIG. 2a is the inverse matrix of the matrix shown in FIG. 2b. The matrices of FIGS. 2a and 2b can be represented by the following equation (1).

$$M^{-1} = \frac{1}{8}M \quad \text{equation (1)}$$

Here, M represents the matrix shown in FIG. 2b. $M^{-1}$ represents the matrix shown in FIG. 2a, i.e., the inverse matrix of M.

By inputting fifteen driving signals to the matrix shown in FIG. 2a through the fifteen driving signal electrodes in correspondence with the matrix shown in FIG. 2a ("1" means a driving signal, and "0" means a non-driving signal or there is no driving signal), a sensing signal shown in the following equation (2) can be obtained.

$$\begin{bmatrix} VRX1(T1) \\ VRX1(T2) \\ VRX1(T3) \\ VRX1(T4) \\ VRX1(T5) \\ VRX1(T6) \\ VRX1(T7) \\ VRX1(T8) \\ VRX1(T9) \\ VRX1(T10) \\ VRX1(T11) \\ VRX1(T12) \\ VRX1(T13) \\ VRX1(T14) \\ VRX1(T15) \end{bmatrix} = (M)^{-1} \begin{pmatrix} C11 \\ C21 \\ C31 \\ C41 \\ C51 \\ C61 \\ C71 \\ C81 \\ C91 \\ C101 \\ C111 \\ C121 \\ C131 \\ C141 \\ C151 \end{pmatrix} \quad \text{equation (2)}$$

Here, VRX1(T1) to VRX1(T15) may mean a voltage of the sensing signal which is transmitted through a first sensing signal electrode in a first interval to a fifth interval. C11 to C151 may mean the capacitances of the node capacitors connected to the first sensing signal electrode.

In the matrix shown in FIG. 2a, one row of the 15×15 matrix may correspond to the interval in which the driving signal is driven, and each column may correspond to one driving signal electrode. "0" in the matrix means that the driving signal is not driven, and "1" means that the driving signal is driven. Therefore, eight driving signal electrodes to which the driving signals are applied and seven driving signal electrodes to which the driving signals are not applied are represented in each column of the matrix M.

It is assumed that the first row at the top of the matrix of FIG. 2a is the first interval and the second row under the first row is the second interval. First, the first interval shows (1, 1, 1, 0, 1, 0, 1, 1, 0, 0, 1, 0, 0, 0, 1) from left to right, and the driving signal is driven to the first to third driving signal electrodes TX1 to TX3, the fifth driving signal electrode TX5, the seventh driving signal electrode TX7, the eighth driving signal electrode TX8, the eleventh driving signal electrode TX11, and the fifteenth driving signal electrode TX15, and the driving signal is not driven to the fourth driving signal electrode TX4, the sixth driving signal electrode TX6, the ninth driving signal electrode TX9, the tenth driving signal electrode TX10, and the twelfth to fourteenth driving signal electrodes TX12 to TX14. Further, the second interval shows (1, 1, 0, 1, 0, 1, 1, 0, 0, 1, 0, 0, 0, 1, 1) from left to right, and the driving signal is driven to the first and second driving signal electrodes TX1 and TX2, the fourth driving signal electrode TX4, the sixth driving signal electrode TX6, the seventh driving signal electrode TX7, the tenth driving signal electrode TX10, the fourteenth driving signal electrode TX14, and the fifteenth driving signal electrode TX15, and the driving signal is not driven to the third driving signal electrode TX3, the fifth driving signal electrode TX5, the eighth and ninth driving signal electrodes TX8 and TX9, and the eleventh to thirteenth driving signal electrodes TX11 to TX13. Accordingly, there are driving signal electrodes that are not driven in the second interval among the driving signal electrodes which are driven in the first interval, and there are driving signal electrodes that are driven in the second interval among the driving signal electrodes which are not driven in the first interval. That is, while the driving signals are applied to the plurality of the driving signal electrodes by the driving signal supplying unit 200 in accordance with each of the columns of the matrix M, it is controlled that the driving signal is applied simultaneously to the at least two of the plurality of the driving signal electrodes in the first interval, and the driving signal is not applied to at least one driving signal electrode. Also, it is controlled that the driving signal is not applied in the second interval to at least one of the driving signal electrodes to which the driving signal has been simultaneously applied in the first interval among the plurality of the driving signal electrodes, and the driving signal is applied to at least one of the driving signal electrodes to which the driving signal has not been applied in the first interval. Therefore, a combination of the driving signal electrode to which the driving signal is applied in the first interval and the driving signal electrode to which the driving signal is not applied in the first interval may be different from a combination of the driving signal electrode to which the driving signal is applied in the second interval and the driving signal electrode to which the driving signal is not applied in the second interval.

Through the use of the matrix M shown in FIG. 2*a*, which is the inverse matrix of the matrix shown in FIG. 2*b*, the following equation (3) can be obtained. By using the following equation (3), information on the capacitance of each of the node capacitors C11 to C151 can be obtained.

$$\begin{bmatrix} C11 \\ C21 \\ C31 \\ C41 \\ C51 \\ C61 \\ C71 \\ C81 \\ C91 \\ C101 \\ C111 \\ C121 \\ C131 \\ C141 \\ C151 \end{bmatrix} = (M) \begin{pmatrix} VRX1(T1) \\ VRX1(T2) \\ VRX1(T3) \\ VRX1(T4) \\ VRX1(T5) \\ VRX1(T6) \\ VRX1(T7) \\ VRX1(T8) \\ VRX1(T9) \\ VRX1(T10) \\ VRX1(T11) \\ VRX1(T12) \\ VRX1(T13) \\ VRX1(T14) \\ VRX1(T15) \end{pmatrix} \quad \text{equation (3)}$$

Therefore, the driving signal shown in the matrix formed by using the PRBS code can be simultaneously applied to the fifteen driving signal electrodes. By using this, the information on the capacitance of the node capacitor can be obtained, thereby more quickly obtaining the location of the touch. In particular, when the PRBS code is used, 7×7 matrix and 31×31 matrix are usable, so that it is possible to control the number of the driving signal electrodes to which the driving signal is simultaneously applied, and the matrix can be variously applied depending on the size of the touch panel. Here, the matrix which is formed by using 4-bit PRBS code and shown in FIGS. 2*a* and 2*b* is nothing but an example, and may have other forms. The matrix formed by using the 4-bit PRBS code satisfies that there are driving signal electrodes to which the driving signal is not driven in the second interval among the driving signal electrodes to which the driving signal is driven in the first interval and there are driving signal electrodes to which the driving signal is driven in the second interval among the driving signal electrodes to which the driving signal is driven in the first interval.

Here, although it is disclosed that the combination of the driving signal electrode to which the driving signal is driven in the same interval and the driving signal electrode to which the driving signal is not driven in the same interval is formed by the PRBS code, there is no limit to this.

Figure 3B:
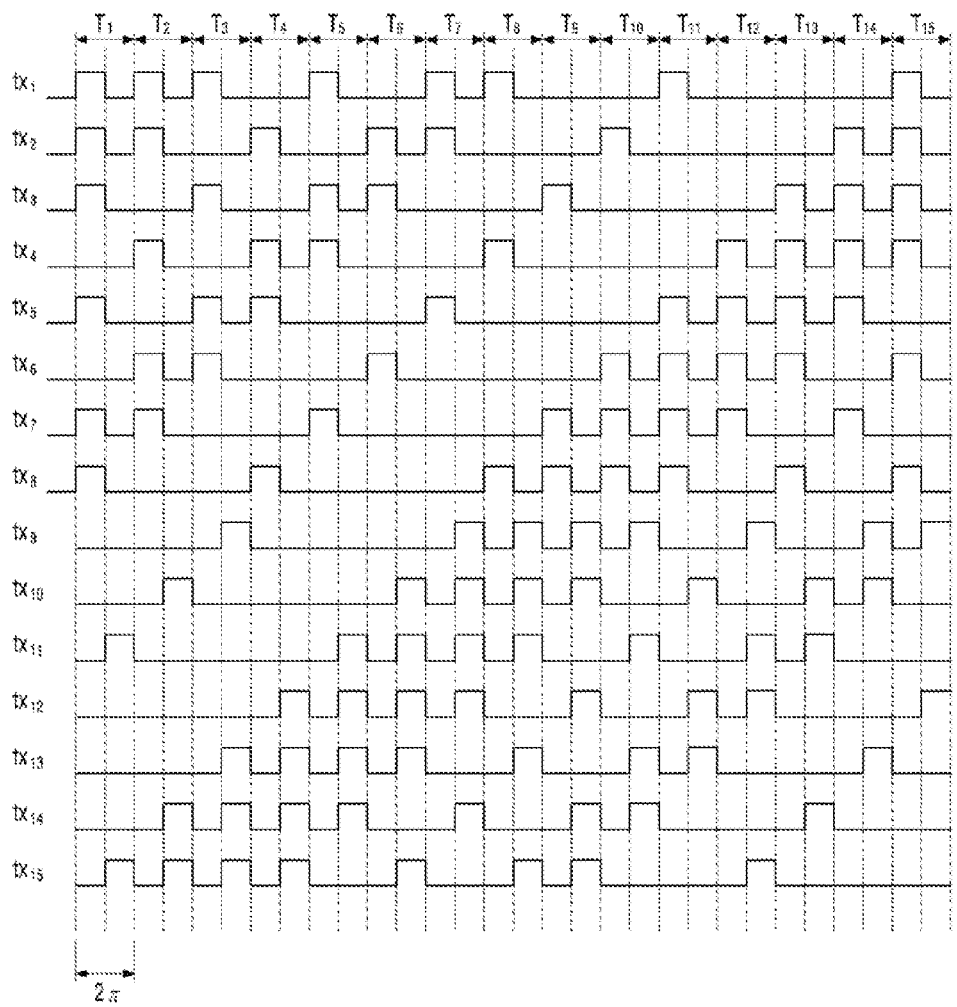

FIG. 3*a* is a view showing a matrix showing a code generating a driving signal in a driving signal supplier. FIG. 3*b* is a showing a matrix which shows showing a waveform of a driving signal corresponding to the matrix shown in FIG. 3*a*.

The driving signal supplier 200 receives the code and generates a first to a fifteenth driving signals tx1 to tx15 which are simultaneously transmitted. The first to the fifteenth driving signals tx1 to tx15 are generated in response to the matrix shown in FIG. 3*a*. A part of the matrix shown in FIG. 3*a*, which corresponds to the codes of the first to the eighth driving signals, may be formed identically to the matrix of FIG. 2*a*. A part of the matrix shown in FIG. 3*a*, which corresponds to the codes of the ninth to the fifteenth driving signals, may be formed by multiplying the matrix of FIG. 2*a* by −1. When the sign of the code becomes negative (−) through the multiplication of −1, a 180 degree phase difference occurs. The ninth to the fifteenth driving signals may have a 180 degree phase difference from the first to the eighth driving signals having a positive (+) sign.

Referring to FIGS. 3*a* and 3*b*, when the first to the eighth driving signals tx1 to tx8 have a value of 1, the first to the eighth driving signals tx1 to tx8 may have a value of 1 during half cycle and a value of 0 during the remaining half cycle due to a high pulse. When the code of the first driving signal tx1 is (1, 1, 1, 0, 1, 0, 1, 1, 0, 0, 1, 0, 0, 0, 1), the first driving signal tx1 is driven in the first to the third intervals T1 to T3, the fifth interval T5, the seventh interval T7, the eighth interval T8, the eleventh interval T11 and the fifteenth interval T15, so that the high pulse is repeatedly generated. Also, the first driving signal tx1 is not driven in the fourth interval T4, the sixth interval T6, the ninth interval T9, the tenth interval T10, and the twelfth to the fourteenth intervals T12 to T14. When the code of the second driving signal tx2 is (1, 1, 0, 1, 0, 1, 1, 0, 0, 1, 0, 0, 0, 1, 1), the second driving signal tx2 is driven in the first interval T1, the second interval T2, the fourth interval T4, the sixth interval T6, the seventh interval T7, the tenth interval T10, the fourteenth interval T14 and the fifteenth interval T15, so that the high pulse is repeatedly generated. Also, the second driving signal tx2 is not driven in the third interval T3, the fifth interval T5, the eighth interval T8, the ninth interval T9, the eleventh to the thirteenth intervals T11 to T13. When the code of the third driving signal tx3 is (1, 0, 1, 0, 1, 1, 0, 0, 1, 0, 0, 0, 1, 1, 1), the third driving signal tx3 is driven in the first interval T1, the third interval T3, the fifth interval T5, the sixth interval T6, the ninth interval T9, and the thirteenth to the fifteenth intervals T13 to T15, so that the high pulse is repeatedly generated. Also, the third driving signal tx3 is not driven in the second interval T2, the fourth interval T4, the seventh interval T7, the eighth interval T8, and the tenth to the twelfth intervals T10 and T12. In the aforementioned manner, the fourth to the eighth driving signals tx4 to tx8 are generated in response to the matrix shown in FIG. 3*a*.

The codes of the ninth to the fifteenth driving signals tx9 to tx15 may be the same as a matrix obtained by multiplying the matrix shown in FIG. 2*a* by −1. When the ninth to the fifteenth driving signals tx9 to tx15 have a value of −1, the ninth to the fifteenth driving signals tx9 to tx15 may have a value of 0 during half cycle and a value of 1 during the remaining half cycle due to the high pulse. Accordingly, when the code of the ninth driving signal tx9 is (0, 0, −1, 0, 0, 0, −1, −1, −1, 0, −1, 0, −1, −1), the ninth driving signal tx9 is driven in the third interval T3, the seventh to the tenth intervals T7 to T10, the twelfth interval T12, the fourteenth interval T14 and the fifteenth interval T15, so that the high pulse is repeatedly generated. Also, the ninth driving signal tx9 is not driven in the first interval T1, the second interval T2, the fourth to the sixth intervals T4 to T6, and the eleventh interval T11. When the code of the tenth driving signal tx10 is (0, −1, 0, 0, 0, −1, −1, −1, −1, 0, −1, 0, −1, −1, 0), the tenth driving signal tx10 is driven in the second interval T2, the sixth to the ninth intervals T6 to T9, the eleventh interval T11, the thirteenth interval T13, and the fourteenth interval T14, so that the high pulse is repeatedly generated. Also, the tenth driving signal tx10 is not driven in the first interval T1, the third to the fifth intervals T3 to T5, the tenth interval T10, the twelfth interval T12, and the fifteenth interval T15. When the code of the eleventh driving signal tx11 is (−1, 0, 0, 0, −1, −1, −1, −1, 0, −1, 0, −1, −1, 0, −1), the eleventh driving signal tx11 is driven in the first interval T1, the fifth to the eighth intervals T5 to T8, the tenth interval T10, the twelfth interval T12, the thirteenth interval T13, and the fifteenth interval T15, so that the high pulse is repeatedly generated. Also, the eleventh driving signal tx11 is not driven in the second to the fourth intervals T2 to T4, the ninth interval T9, the eleventh interval T11, the twelfth interval T12, and the fourteenth interval T14. In the aforementioned manner, the twelfth to the fifteenth driving signals tx12 to tx15 are generated in response to the matrix shown in FIG. 3a.

The codes of the driving signals which are simultaneously transmitted to the driving signal electrode in the first interval T1 may be (1, 1, 1, 0, 1, 0, 1, 1, 0, 0, −1, 0, 0, 0, −1). The codes of the driving signals which are simultaneously transmitted to the driving signal electrode in the second interval T2 may be (1, 1, 0, 1, 0, 1, 1, 0, 0, −1, 0, 0, 0, −1, −1). The codes of the driving signals which are simultaneously transmitted to the driving signal electrode in the third interval T3 may be (1, 0, 1, 0, 1, 1, 0, 0, −1, 0, 0, 0, −1, −1, −1). By repeating this manner, the codes of the driving signals which are simultaneously transmitted to the driving signal electrode in the fifteenth interval T15 is (1, 1, 1, 1, 0, 1, 0, 1, −1, 0, 0, −1, 0, 0, 0). In other words, the driving signals which are transmitted to each of the driving signal electrodes in the same interval may include both of a driving signal having a positive (+) sign and a driving signal having a negative (−) sign.

Here, although the driving signals are shown in the form of a square wave, there is no limit to this. The driving signals may be shown in the form of a sine wave, a triangular wave and the like.

Figure 4:
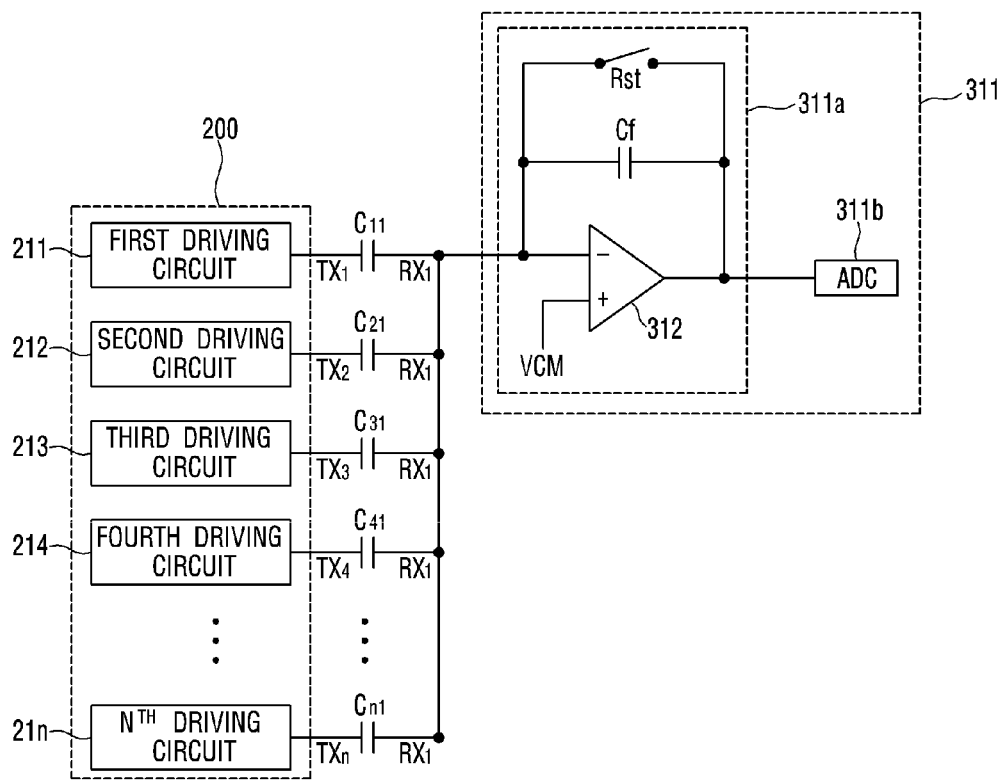
FIG. 4 is a circuit diagram showing a connection relationship among the node capacitor, the driving signal supplier and the sensing signal part, all of which are shown in FIG. 1.

FIG. 4 is a circuit diagram showing a connection relationship among the node capacitor, the driving signal supplier and the sensing signal part, all of which are shown in FIG. 1.

Referring to FIG. 4, the driving signal supplier 200 may include a plurality of driving circuits 211, 212, 213, 214, . . . , 21n. The plurality of driving circuits 211, 212, 213, 214, . . . , 21n may be connected to the plurality of driving signal electrodes TX1, TX2, . . . , TXn−1 and TXn and transmit the driving signal. The sensing signal part 300 may include a plurality of sensing circuits and may detect the capacitances of the node capacitors C11, C21, C31, C41, . . . , Cn1 in accordance with the sensing circuit. Also, the sensing signal part 300 is connected to the controller 400 and transmits the signal corresponding to the capacitance of the node capacitor C11, C21, C31, C41, . . . , Cn1 to the controller 400, so that the controller 400 is able to identify information corresponding to a touch location. Here, it is described that the capacitances of the node capacitors C11, C21, C31, C41, . . . , Cn1, which are transmitted through the first sensing signal electrode RX1, are detected. Therefore, only a first sensing circuit 311 has been shown among the plurality of sensing circuits. However, there is no limit to this.

One end of the first node capacitor C11 is connected to the first driving circuit 211 through the first driving signal electrode TX1, and the other end of the first node capacitor C11 is connected to the first sensing circuit 311 through the first sensing signal electrode RX1. One end of the second node capacitor C21 is connected to the second driving circuit 212 through the second driving signal electrode TX2, and the other end of the second node capacitor C21 is connected to the first sensing circuit 311 through the first sensing signal electrode RX1. One end of the third node capacitor C31 is connected to the third driving circuit 213 through the third driving signal electrode TX3, and the other end of the third node capacitor C31 is connected to the first sensing circuit 311 through the first sensing signal electrode RX1. One end of the fourth node capacitor C41 is connected to the fourth driving circuit 214 through the fourth driving signal electrode TX4, and the other end of the fourth node capacitor C41 is connected to the first sensing circuit 311 through the first sensing signal electrode RX1. In this manner, one end of the $n^{th}$ node capacitor Cn1 is connected to the $n^{th}$ driving circuit 21n through the $n^{th}$ driving signal electrode TXn, and the other end of the $n^{th}$ node capacitor Cn1 is connected to the first sensing circuit 311 through the first sensing signal electrode RX1.

Also, through the first sensing signal electrode RX1, the first sensing circuit 311 may sum up the capacitances of the node capacitors of the node capacitors C11, C21, C31, C41, . . . , Cn1 formed by the plurality of driving signal electrodes TX1, TX2, . . . , TXn−1 and TXn and the first sensing signal electrode RX1, and then may convert the summed result into a digital signal and transmit to the controller 400. Through use of the summed result converted into the digital signal, the controller 400 may determine the capacitances of the node capacitors C11, C21, C31, C41, . . . , Cn1 formed by the plurality of the driving signal electrodes TX1, TX2, . . . , TXn−1 and TXn and the first sensing signal electrode RX1, and may generate information on the touch location. The first sensing circuit 311 may further include an amplifier 311a for summing up the capacitances of the node capacitors C11, C21, C31, C41, . . . , Cn1 and may further include an A/D converter 311b for converting the result summed up by the amplifier 311a into the digital signal. The amplifier 311a may include an OP amplifier 312, a capacitor Cf and a reset switch Rst. The capacitor Cf is disposed between the output terminal and the negative input terminal of the OP amplifier 312. The reset switch Rst is connected in parallel with the capacitor Cf. The negative input terminal of the OP amplifier 312 is connected to the first sensing signal electrode RX1 and receives a signal of the capacitance transmitted from the node capacitors C11, C21, C31, C41, . . . , Cn1.

Through use of the amplifier 311a, the sensing signal part 300 may sum up the capacitances of the node capacitors C11, C21, C31, C41, . . . , Cn1, which are transmitted through the sensing signal electrode. Here, with the generation of the driving signal in response to the code shown in FIG. 2a, the phases of the driving signals which are simultaneously applied may be the same as each other. When the phases of the driving signals are the same as each other, the capacitances of the node capacitors are summed up with the same sign, so that the sum of the capacitances of the node capacitors may be the same as a sum of the absolute values of the capacitances of the node capacitors. Therefore, the sum of the capacitances of the node capacitors has a very large value.

The signal output from the sensing signal part 300 may be represented by the following equation (4).

$$Vout = V_{tx} \times \frac{(C11 + C21 + \ldots C_n1)}{Cf} \quad \text{equation (4)}$$

Here, Vout represents a voltage of the signal output from the amplifier 311a to the A/D converter 311b. C11, C21, ..., Cn1 represent the capacitance of the node capacitor. Cf represents a capacitor which sums up the capacitance of the node capacitor in the amplifier 311a.

In the equation (4), the voltage of the signal output from the amplifier 311a to the A/D converter 311b is proportional to the sum of the capacitance of the node capacitor and is inversely proportional to the capacitance of the capacitor Cf of the amplifier 311a. Therefore, the more the number of the driving signal electrodes to which the driving signal is simultaneously driven is, the more the voltage of the signal output from the amplifier 311a to the A/D converter 311b may become very large. Accordingly, by use of the capacitor Cf which is used in the amplifier 311a and has a large capacitance, it is possible to lower the voltage of the signal output from the amplifier 311a to the A/D converter 311b. However, in order to increase the capacitance of the capacitor Cf, the size of the capacitor Cf should be larger. Due to the large size of the capacitor Cf, there is a problem that the size of the sensing signal part 300 becomes larger. Therefore, there is a requirement that the voltage of the signal output from the amplifier 311a to the A/D converter 311b is reduced without increasing the size of the capacitor Cf.

However, when the driving signal is generated in response to the codes shown in FIG. 3a, the driving signals of which phases are not the same may be included among the driving signals which are simultaneously applied. When the driving signals of which phases are not the same are included, the capacitances of the node capacitors are summed up with the different sign, so that the sum of the capacitances of the node capacitors may be less than the sum of the absolute values of the capacitances of the node capacitors. Accordingly, even if the size of the capacitor Cf of the amplifier 311a is not increased, it is possible to lower the voltage of the signal output from the amplifier 311a to the A/D converter 311b.

FIG. 5 is a flowchart showing a method for detecting an input in the touch panel input device shown in FIG. 1.

Referring to FIG. 5, shown is a method for detecting the touch location by detecting the capacitance of the node capacitor in the touch panel including the plurality of node capacitors, each of which is formed by one of the plurality of driving signal electrodes and one of the plurality of sensing signal electrodes. While the driving signals are applied to the plurality of the driving signal electrodes, in the first interval, it may be controlled that the driving signal is applied simultaneously to the at least two of the plurality of the driving signal electrodes and the driving signal is not applied to at least one driving signal electrode. It may be controlled that one of the driving signals which are applied to the at least two driving signal electrodes has a phase difference from the other driving signals (S500). Here, the phase difference may be 180 degree. Also, in the second interval, it may be controlled that the driving signal is not applied to at least one of the driving signal electrodes to which the driving signal has been simultaneously applied in the first interval, and the driving signal is simultaneously applied to at least two driving signal electrodes, among the plurality of the driving signal electrodes, including at least one of the driving signal electrodes to which the driving signal has not been applied in the first interval, wherein, one driving signal among the driving signals which are applied to the at least two driving signal electrodes may be controlled to have a phase difference from the other driving signals (S510). Here, the phase difference may be 180 degree. Also, the first sensing signal including the information on the capacitances of the node capacitors, which have been summed up in the first interval, and the second sensing signal including the information on the capacitances of the node capacitors, which have been summed up in the second interval, can be detected (S520). Also, it is possible to determine the capacitance of each of the node capacitors by comparing the first sensing signal with the second sensing signal (S530).

In the embodiment, the combination of the driving signal electrode to which the driving signal is applied and the driving signal electrode to which the driving signal is not applied may correspond to a Pseudo-Random Bit Stream (PRBS) code. Further, the driving signals having a phase difference may be controlled to correspond to a code obtained by multiplying the PRBS code by −1.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch panel input device comprising:
   a touch panel which comprises a plurality of node capacitors, each of which is formed by one of a plurality of driving signal electrodes and one of a plurality of sensing signal electrodes;
   a driving signal supplier which drives simultaneously at least two of the plurality of driving signal electrodes by applying driving signals; and
   a sensing signal part which receives a sensing signal comprising information on capacitances of the plurality of node capacitors through the plurality of sensing signal electrodes,
   wherein the driving signal is controlled to comprise a plurality of time intervals in which the driving signal is applied to at least one of the at least two driving signal electrodes simultaneously driven, and in which the driving signal is not applied to at least one of the at least two driving signal electrodes simultaneously driven, wherein the driving signal supplier causes that a combination of the driving signal electrode to which the driving signal is applied in one of the plurality of time intervals and the driving signal electrode to which the driving signal is not applied in the one of the plurality of time intervals is different from a combination of the driving signal electrode to which the driving signal is applied in the other of the plurality of time intervals and the driving signal electrode to which the driving signal is not applied in the other of the plurality of time intervals, and wherein at least one among the driving signals which are simultaneously applied to the driving signal electrodes has a phase difference from the other driving signals, and wherein the combination of the driving signal electrode to which the driving signal is applied and the driving signal electrode to which the driving signal is not applied is formed through a Pseudo-Random Bit Stream (PRBS) code, and wherein the driving signals having the phase difference correspond to a code obtained by multiplying the PRBS code by −1.

2. The touch panel input device of claim 1, wherein the phase difference is 180 degrees.

3. The touch panel input device of claim 2, wherein the sensing signal part further comprises an amplifier, and wherein the amplifier sums up the capacitances of the plurality of node capacitors to which the applied driving signal is transmitted.

4. The touch panel input device of claim 3, wherein the sensing signal part further comprises an A/D (analog-to-digital) converter which is connected to the amplifier and converts the signal transmitted from the amplifier into a digital signal.

5. The touch panel input device of claim 1, further comprising a controller, wherein the controller controls an output from the driving signal supplier and detection of the sensing signal part.

6. A touch input detection method for detecting the touch location by detecting the capacitance of the node capacitor in the touch panel comprising the plurality of node capacitors, each of which is formed by one of the plurality of driving signal electrodes and one of the plurality of sensing signal electrodes, the method comprising:

driving the plurality of driving signal electrodes by applying driving signals, causing that, in a first interval, the driving signal is applied to at least two driving signal electrodes of the plurality of driving signal electrodes and the driving signal is not applied to at least one driving signal electrode of the plurality of driving signal electrodes, and causing that one of the driving signals which are applied to the at least two driving signal electrodes has a phase difference from the other driving signals;

causing that, in a second interval, the driving signal is not applied to at least one of the driving signal electrodes to which the driving signal has been simultaneously applied in the first interval and the driving signal is simultaneously applied to at least two driving signal electrodes, among the plurality of driving signal electrodes, comprising at least one of the driving signal electrodes to which the driving signal has not been applied in the first interval, and causing that one driving signal among the driving signals which are applied to the at least two driving signal electrodes has a phase difference from the other driving signals;

detecting a first sensing signal comprising information on the capacitances of the node capacitors, which have been summed up in the first interval, and a second sensing signal comprising information on the capacitances of the node capacitors, which have been summed up in the second interval; and determining the capacitance of each of the node capacitors by comparing the first sensing signal with the second sensing signal, wherein a combination of the driving signal electrode to which the driving signal is applied and the driving signal electrode to which the driving signal is not applied corresponds to a Pseudo-random bit stream (PRBS) code, and wherein the driving signals having a phase difference correspond to a code obtained by multiplying the PRBS code by −1.

* * * * *